INVENTORS
JOSEPH A. KIES
EDWARD R. SEIBERT
ALEXANDER G. ROZNER
JOHN E. TYDINGS

3,507,941
PROCESS TO INCREASE STRENGTH OF ARTIFICIAL ORGANIC MATERIALS
Joseph A. Kies, Chevy Chase, Md., Edward R. Seibert, Washington, D.C., and Alexander G. Rozner, Bethesda, and John E. Tydings, Rockville, Md., assignors to the United States of America as represented by the Secretary of the Navy
Filed July 12, 1967, Ser. No. 653,304
Int. Cl. B29f *3/00*
U.S. Cl. 264—88                                            2 Claims

ABSTRACT OF THE DISCLOSURE

This disclosure is directed to a method of increasing the strength of polypropylene produced by the standard processes. As-received polypropylene is subjected to mechanical cold working by means of a cold-hydrostatic extrusion process which results in a substantial increase in the maximum usable tensile strength of the material. This tensile strength of the extruded material has been found to increase with the extrusion ratio, defined as a ratio of the cross-sectional area of the material before cold-hydrostatic extrusion to the cross-sectional area of the extrusion die.

STATEMENT OF GOVERNMENT INTEREST

The invention described herein may be manufactured and used by or for the Government of the United States of America for governmental purposes without the payment of any royalties thereon or therefor.

The present invention relates to materials of polypropylene and more particularly to a method for modifying the properties thereof to increase the strength thereof.

Polypropylene is the lightest of all chemical plastics. Molded parts have excellent dielectric properties, low creep values, and smooth surfaces which resist the attack of most chemicals.

Polypropylene devices are formed by thermoforming, injection and extrusion methods. In prior art methods used to form plastic articles, sheet, film, filaments, etc., the temperature required is from 375° F. to above 600° F. Other processes in forming polypropylene include machining and lamination of film each of which requires high temperature.

In the conventional extrusion production process for making polypropylene element, the materials are melted in the extruder, forced through dies which shape them into rod, bars, fibers, etc. and then the finished product is immediately cooled by water or air.

It is therefore an object of the present invention to provide a method of increasing the strength of polypropylene as produced by a manufacturer.

Another object is to provide a plastic structure which has a large strength to weight ratio.

Other objects and advantages of the invention will hereinafter become more fully apparent from the following description of the method with reference to the annexed drawing, wherein.

Figure 1:
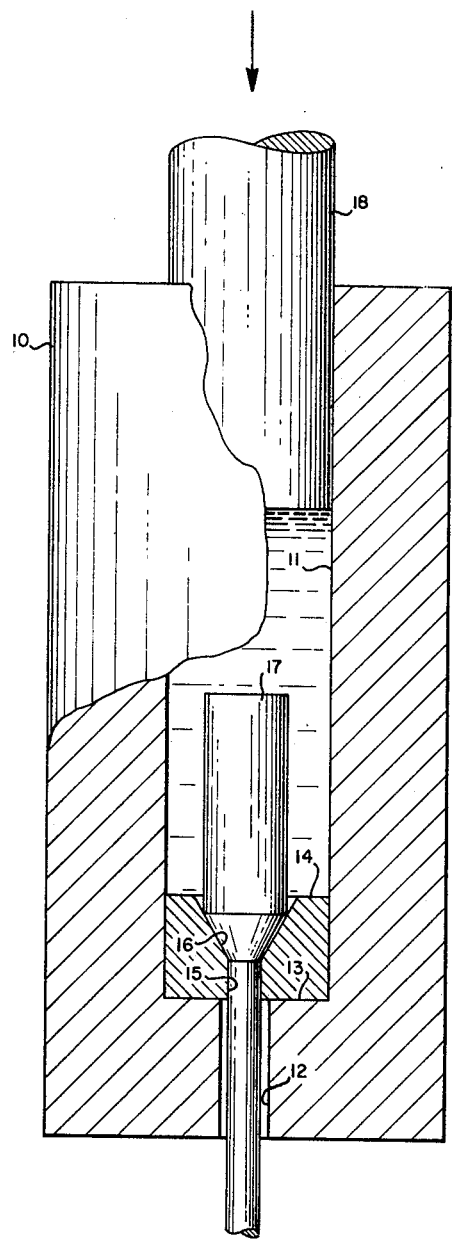
FIG. 1 is a cross sectional view of a device for cold-hydrostatically extruding polypropylene.

FIG. 1 illustrates a cold-hydrostatic extrusion apparatus such as used for carrying out the method of this invention. The apparatus includes a housing 10 of any suitable outside dimension, shape and material suitable to withstand high pressures required to cold extrude polypropylene. The housing includes an aperture along the axis thereof in which a portion 11 forms a chamber that receives the material to be extruded and a smaller diameter portion 12 through which the material is extruded. The chamber within which the material is placed is of a greater diameter than the material to be extruded and is of sufficient length to receive the material therein. The smaller diameter end is of sufficient diameter to pass the extruding material and the housing in the vicinity of the smaller diameter portion provides a supporting seat 13 for a die 14. The die is provided with an extrusion aperture 15 and a conical entry section 16 to receive a starter end of the material or billet 17. A piston 18 is forced into the fluid-filled chamber by any suitable means, developing sufficient pressure to force the billet 17 through the die 14.

In use of the apparatus to carry out the method of this invention, as-received polypropylene rod material is shaped at one end to fit into the conical shaped end of the die through which the material is extruded. Fluid is admitted into the chamber about the polypropylene material and fills the chamber. The piston is forced into the chamber above the fluid in the chamber. It is noted that the fluid surrounds the exposed surfaces the material within the chamber thereby applying radial as well as axial pressure onto the material as the piston is forced toward the material. Thus, there are no frictional forces between the material and the chamber wall wherein the only frictional forces are between the material and the die which is over a relatively short distance. A force is applied to the piston which builds up pressure on the fluid within the chamber and after sufficient pressure build up, the polypropylene material is extruded through the die. The extrusion is done at room temperature with each, the fluid and material at room temperature. The deformation of the material in the die is the result of non-uniform hydrostatic compression forces acting on the material in the die section, resulting in deformation along the plane of principal shear stress with the attendant increase in crystallinity. This provides the increased strength of the extruded material compared to the as-received commercial extruded materials. It has been determined that the ultimate tensile strength increases wih an increase in extrusion ratio.

The maintenance of hydrostatic compression on the material during deformation in the die tends to reduce the formation of cracks which also contribute to the increase in strength.

Figure 2:
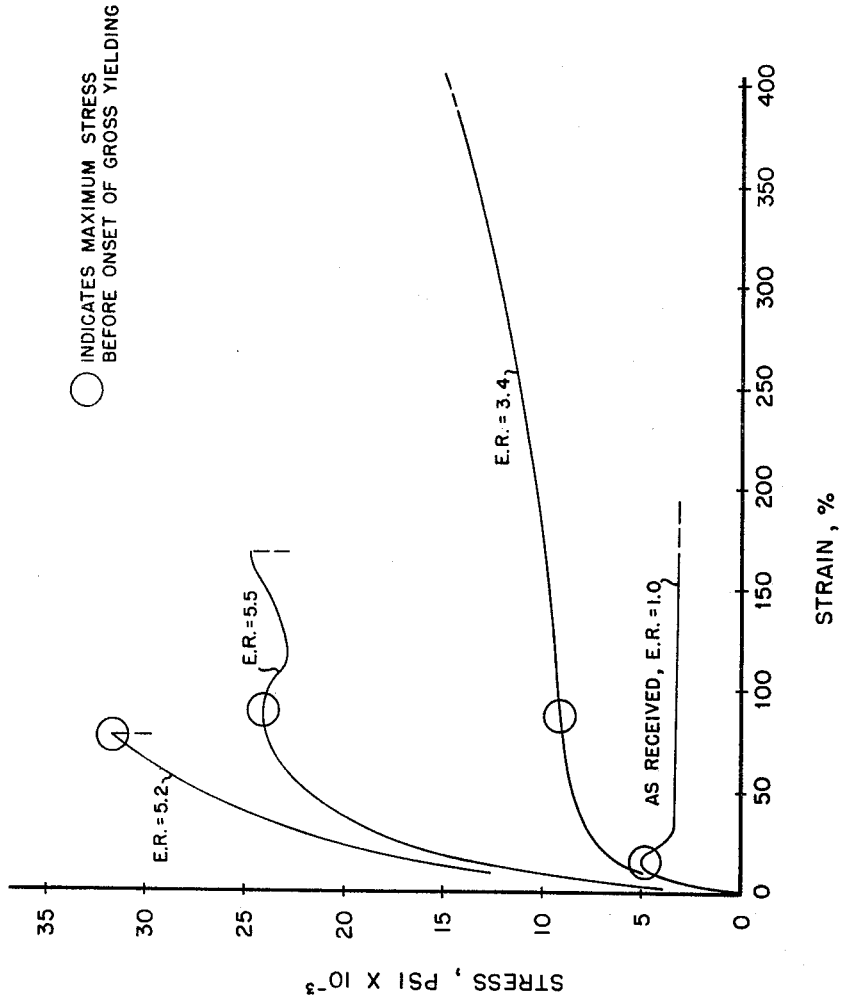
FIG. 2 shows typical stress vs. strain curves for polypropylene extruded various amounts.
Figure 3:
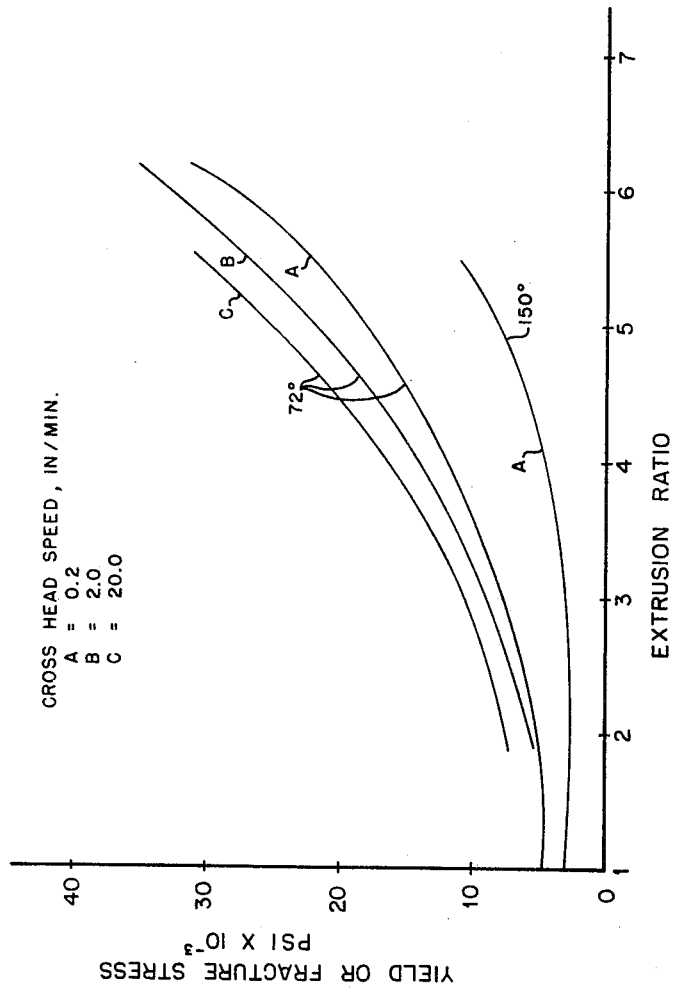
FIG. 3 illustrates a plot of the yield or fracture stress vs. extrusion ratio for cold extruded specimens tested with a tensile machine operated at different speeds.

The stress most indicative of the strength of the material is taken as the maximum load which is developed before the onset of gross yielding, divided by the original cross sectional area of the specimen. This stress is indicated in FIG. 2 which shows typical stress vs. strain curves for polypropylene tested at 72° F. and at a cross-head speed of 0.2 in./min. This stress, the yield or fracture stress, has been plotted as a function of extrusion ratio for specimens tested at 72° F. and at three cross-head speeds as shown in FIG. 3. Also plotted on FIG. 3 is the response of the material when tested at 150° F. and the slowest of the three cross-head speeds. From this figure, it can be seen that the stress increases with the speed of testing and with an increase in the extrusion ratio. The stress of 31,500 p.s.i. developed in the specimen extruded to 6.2 extrusion ratio, and tested at 72° F. and 0.2 in./min. cross-head speed indicates a tensile ultimate strength-to-weight ratio 21.6% higher than that of a titanium alloy having an ultimate tensile strength of 130,000 p.s.i.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. A process of increasing the tensile strength of manutured polypropylene which comprises:
   placing polypropylene material at room temperature into an extrusion apparatus at room temperature and with said apparatus having an extrusion die,
   said material having a cross sectional dimension less than said extrusion apparatus and greater than said extrusion die,
   placing said material within said extrusion apparatus with one end within the entry to said die so that all of said material is maintained in spaced relationship from said extrusion apparatus and is supported only by said end within said entry,
   surrounding the exposed surfaces of said material within said extrusion apparatus, with a fluid,
   subjecting said fluid to a pressure sufficient to force said polypropylene material through said die,
   whereby the tensile strength of said polypropylene is increased upon being forced through said die at room temperature.

2. A process as claimed in claim 1; which includes, shaping the end of said material placed in the entry to said die to have the same shape as the die entry.

References Cited

UNITED STATES PATENTS

| | | | |
|---|---|---|---|
| 3,171,350 | 3/1965 | Metcalf et al. | 264—323 X |
| 3,262,155 | 7/1966 | Alexander. | |
| 3,284,560 | 11/1966 | King et al. | 264—292 |

FOREIGN PATENTS 1,011,248 11/1965 Great Britain.

ROBERT F. WHITE, Primary Examiner

A. M. SOKAL, Assistant Examiner

U.S. Cl. X.R.

264—323